(12) United States Patent
Dian et al.

(10) Patent No.: US 7,151,608 B2
(45) Date of Patent: Dec. 19, 2006

(54) METHOD FOR MEASURING THE THICKNESS OF A MAIL ITEM

(75) Inventors: Jean-Raoul Dian, Antony (FR); Jean-Marc Teluob, Cornas (FR)

(73) Assignee: Solystic, Gentilly (FR)

( * ) Notice: Subject to any disclaimer, the term of this patent is extended or adjusted under 35 U.S.C. 154(b) by 72 days.

(21) Appl. No.: 10/529,761

(22) PCT Filed: Dec. 30, 2004

(86) PCT No.: PCT/FR2004/050765

§ 371 (c)(1),
(2), (4) Date: Mar. 30, 2005

(87) PCT Pub. No.: WO2005/085752

PCT Pub. Date: Sep. 15, 2005

(65) Prior Publication Data

US 2005/0280833 A1  Dec. 22, 2005

(30) Foreign Application Priority Data

Feb. 3, 2004 (FR) ................... 04/50193

(51) Int. Cl.
*G01B 11/28* (2006.01)

(52) U.S. Cl. .................................................. 356/630
(58) Field of Classification Search ................. 356/630
See application file for complete search history.

(56) References Cited

U.S. PATENT DOCUMENTS

| 4,937,460 | A | | 6/1990 | Duncan et al. | |
|---|---|---|---|---|---|
| 6,032,946 | A | * | 3/2000 | Marshall et al. | ............ 271/152 |
| 6,100,986 | A | * | 8/2000 | Rydningen | ................. 356/630 |
| 6,644,649 | B1 | | 11/2003 | Chaume et al. | |
| 6,757,069 | B1 | * | 6/2004 | Bowles | ....................... 356/630 |

FOREIGN PATENT DOCUMENTS

| DE | 199 59 570 A | 5/2001 |
|---|---|---|
| EP | 0 816 931 A | 1/1998 |

* cited by examiner

*Primary Examiner*—Hwa (Andrew) Lee
*Assistant Examiner*—Isiaka O. Akanbi
(74) *Attorney, Agent, or Firm*—Sughrue Mion, PLLC

(57) ABSTRACT

A method of using reflection of a laser ray (LZ) for measuring the thickness (e) of a flat mail item (1) consists in nipping the mail item by means of an elastically deformable member (3) that has a first surface (4a) in contact with one face of said mail item, and a reflective second surface (4b) substantially parallel to said first surface, and in directing the laser ray onto said reflective second surface (4b) for the purpose of measuring the thickness of the mail item.

9 Claims, 4 Drawing Sheets

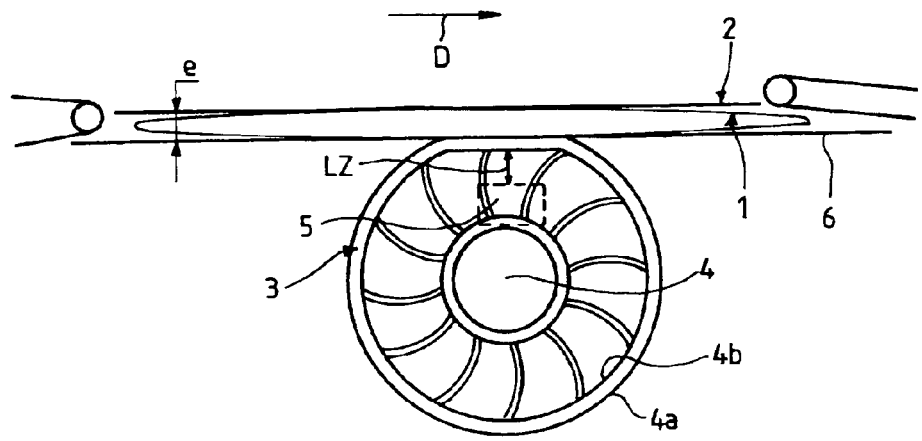
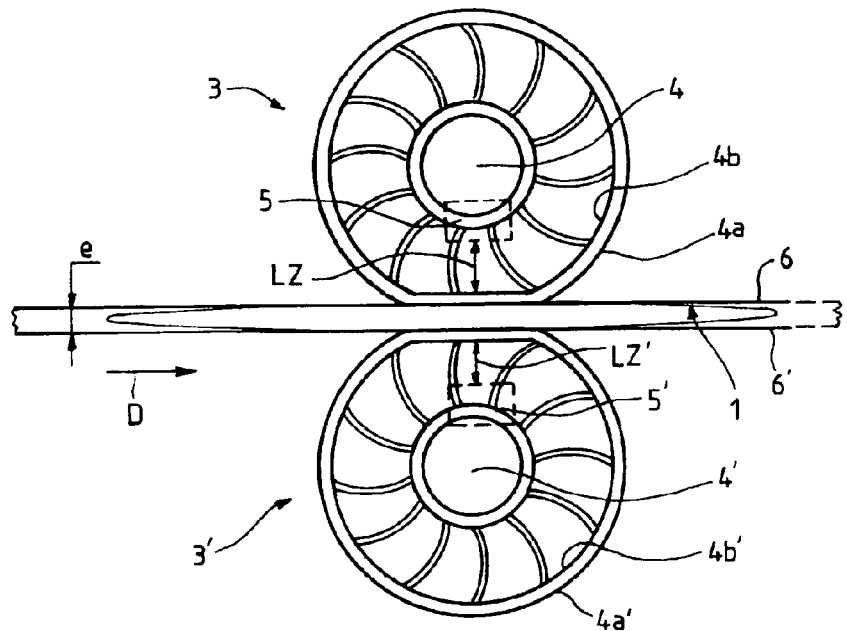

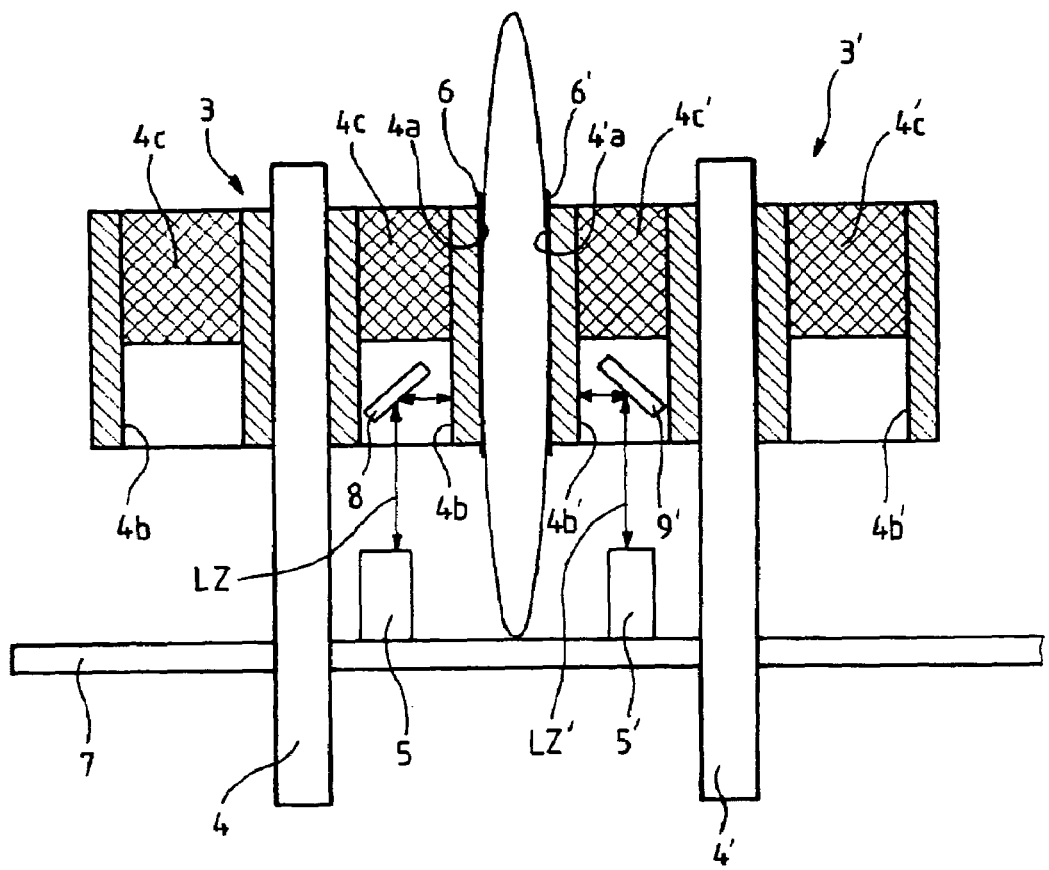
FIG_3
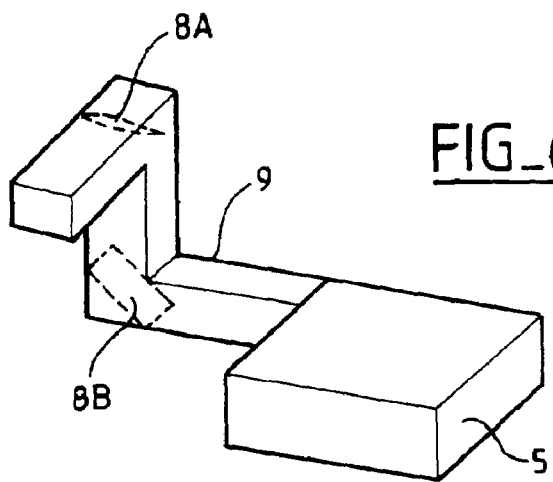
FIG_6

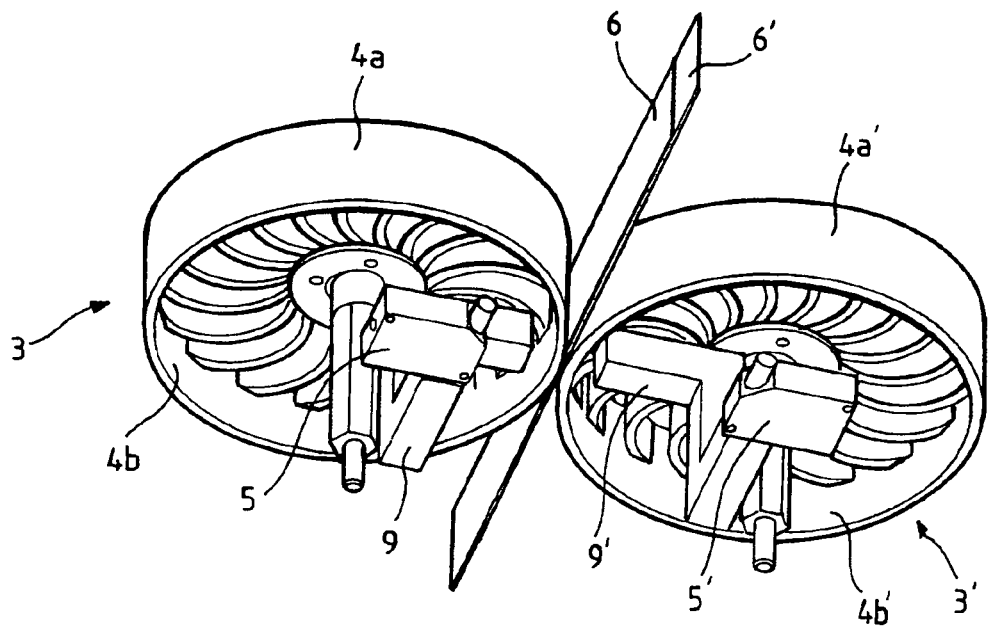
FIG_4
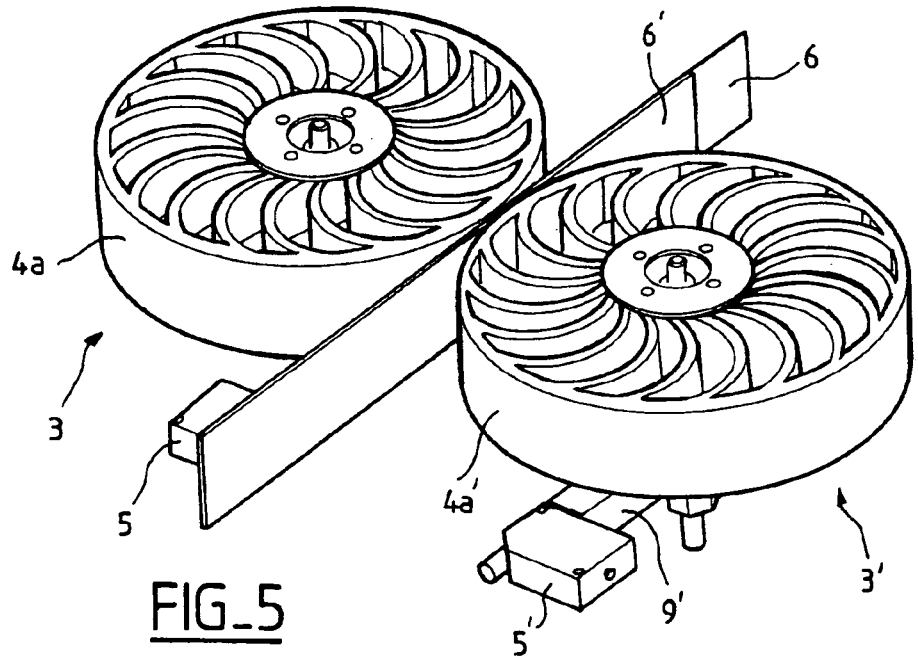
FIG_5

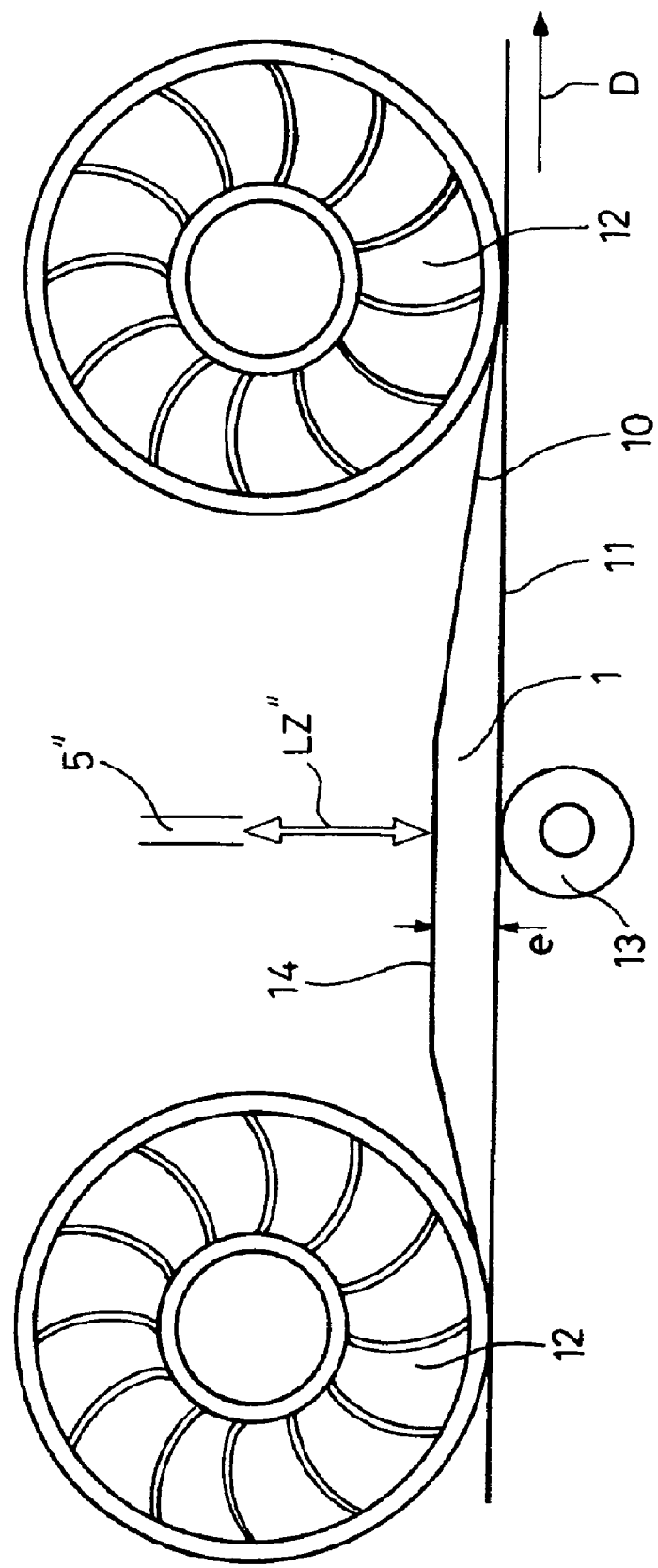

METHOD FOR MEASURING THE THICKNESS OF A MAIL ITEM

The invention relates to a method of using reflection of a laser ray for measuring the thickness of a flat mail item.

The invention is more particularly applicable to measuring the thicknesses of flat mail items that are moved in series, on edge, and at high speed through a postal sorting installation. Accurate measurement of thickness of such mail items is essential in order to perform the various handling operations leading to sorting such as segregation of mail items on the basis of format, verification of postage amount, or indeed monitoring the filling of the bins or of the joggers in the sorting outlets of the postal sorting installation.

In a postal sorting installation, the thicknesses of mail items should be measured in real time with the constraints that mail items have a wide variety of sizes and thus of thicknesses (length in the range 140 millimeters (mm) to 400 mm, and thickness in the range 0 to 32 mm). In addition, mail items are moved at very high speeds, speeds in common use reaching four meters per second.

Various techniques are already known for measuring the thicknesses of flat mail items in motion in a postal sorting machine.

One known technique is the laser reflection technique which consists in sending two laser rays onto respective ones of the two opposite faces of each mail item, by means of two laser cells situated facing each other on either side of the conveyor path along which the mail items are conveyed. The time taken for the laser rays to reflect off the opposite faces of the mail item serves as a physical magnitude for measuring the thickness of the mail item in differential manner. That measurement technique makes it possible to measure only the apparent thickness of each mail item. Many mail items are in the form of a wrapper made of plastic, and, on passing between the two laser cells, the wrapper of each such mail item can swell or be deformed so that the apparent thickness measured for said mail item can differ very considerably from its real thickness, thereby giving rise to errors in the handling operations such as format segregation, verification of postage amount, or indeed monitoring of the filling of the bins at the sorting outlets. In addition, that technique is highly dependent on the type and the quality of the outside surface of each mail item off which the laser ray is reflected. It has been observed that measuring by using laser reflection off certain mail items having outside surfaces made of dark plastic gives results that are wildly inaccurate.

Another known technique is based on the use of mechanical feelers. The mail item, as driven by two parallel motor-driven conveyor belts, passes between two feelers. The displacement of the feelers relative to their rest position serves as a physical magnitude for measuring the thickness of each mail item. The feelers are generally mounted on vertical axes and they are connected mechanically to a sensor for measuring angular deflection. That type of sensor is unsuitable for measuring the thicknesses of mail items that are moved at high speeds, unless feelers are provided that are made of materials that are ultra-lightweight, highly costly and that withstand mechanical constraints poorly. In addition, the friction of the feelers on fragile mail items, etc. mail items in very fine plastics wrappers, can damage such mail items.

Known measurement techniques are therefore unreliable, costly, and inaccurate, sometimes giving rise to wildly inaccurate results, and generating handling errors in a postal sorting installation.

An object of the invention is to remedy the above-presented drawbacks by proposing a method of measuring the real thickness of a flat mail item that does not damage the mail item, and that offers a very rapid response time, and improved reliability, regardless of the type of the mail item.

To this end, the invention provides a method of using reflection of a laser ray for measuring the thickness of a flat mail item moving through a sorting machine, said method being characterized in that it comprises the following steps:

nipping the mail item by means of an elastically deformable member that is movably mounted and that moves with the movement of the mail item, said member having a first surface in contact with one face of said mail item, and a reflective second surface substantially parallel to said first surface; and directing the laser ray onto said reflective second surface for the purpose of measuring the thickness of the mail item.

The elastically deformable member may consist of a conveyor belt having a reflective face or a reflective line on that face which is opposite from the face in contact with mail item.

Preferably, in accordance with the invention, said member is an elastically deformable wheel that presents an annular tread strip in contact with one face of the mail item and, on the side opposite from the tread strip, a reflective annular strip which is concentric with the annular tread strip and against which the laser ray is directed in order to perform measurement of the thickness of the mail item in absolute manner. With such apparatus, in contact with the mail item, the annular tread strip is deformed radially over a distance corresponding to the real thickness of the mail item, and this deformation distance is measured by laser reflection off the reflective annular strip which can have calibrated pigmentation. The thickness measurement of the invention is thus independent of the type and of the quality of the outside surface of the mail item. This contact-free thickness measurement principle is particularly well suited to real time measurement of mail items that are moved in series, on edge, and at very high speed through a postal sorting machine that is already equipped with passage detectors for detecting when mail items go past. Such passage detectors serve to synchronize the thickness measurements with the passing of the mail items.

In apparatus of the invention, for using reflection of a laser ray for measuring the thickness of a flat mail item moving through a sorting machine, said member is formed by two elastically deformable wheels disposed on either side of the mail item. Each elastically deformable wheel presents an annular tread strip and, on the side opposite from the tread strip, a reflective annular strip which is concentric with the annular tread strip. The annular tread strips of the two wheels are in contact with respective ones of the two opposite faces of the mail item, and two laser rays are directed onto respective ones of the reflective annular strips of the two elastically deformable wheels, in order to perform measurement in differential manner.

Such measurement apparatus having one or two elastically deformable wheels can further present the following features:

each laser ray is guided in a tube provided with bends and provided with mirrors inside it, thereby making it possible to install the laser cell at a sufficient distance from the zone off which the laser ray is reflected, for the purpose of improving the accuracy of the measurement, and outside the wheel, in particular for facilitating any maintenance operations; and each elastically deformable wheel is a bladed wheel made of an elastomer material and in which the reflective annular strip of the wheel extends from one face of the wheel over a portion of the width of the wheel that is blade-free.

The method and apparatus of the invention are described in more detail below with reference to the drawings, in which:

FIG. 1 very diagrammatically shows an implementation of a method of the invention with a single elastically deformable wheel;

FIG. 2 very diagrammatically shows another implementation of a method of the invention with two elastically deformable wheels;

FIG. 3 is a very diagrammatic view of the path followed by the laser ray in the two elastically deformable wheels shown in FIG. 2;

FIG. 4 is a view from underneath and in perspective, showing apparatus of the invention having two elastically deformable bladed wheels for measuring the thicknesses of flat mail items;

FIG. 5 is a view from above and in perspective, showing the apparatus of FIG. 4;

FIG. 6 diagrammatically shows the arrangement of a tube for guiding a laser ray between a laser cell and the reflective annular strip of a wheel in the apparatus shown in FIG. 4 or 5; and FIG. 7 very diagrammatically shows another implementation of the method of the invention with measurement by laser reflection off a conveyor belt between two elastically deformable wheels.

In the description, the term "flat item" is used to designate a flat mail item of the letter or "flat" type.

The principle of the invention for using reflection of a laser ray for measuring the thickness of a flat item that extends in a certain longitudinal direction consists in nipping the flat item by means of an elastically deformable member having an outside first surface in contact with one face of the flat item and a reflective second surface that is substantially parallel to the first surface, and in directing the laser ray onto said reflective second surface in a direction that is substantially perpendicular to the longitudinal direction.

FIG. 1 shows an implementation of the method of the invention making it possible to measure, with high accuracy, the thickness of a flat item, in particular a flat item in motion. In this example, the thickness of the flat item 1, which is disposed on edge, is measured by means of a single laser reflection. The flat item 1 is nipped between a stationary plate 2 and an elastically deformable wheel 3. The wheel 3 is a bladed wheel which is mounted to rotate about a stationary axis 4, and it can be seen in this figure that the wheel 3 has an annular tread strip 4a which is in contact with one face of the flat item 1. It can be seen in this figure that the tread strip 4a is deformed radially under the pressure exerted by the flat item when it is engaged in the direction D between the fixed plate 2 and the wheel 3, over a distance e that corresponds to the thickness of the flat item. It should be understood that the tread strip of the wheel comes flush with the reference plate 2 without being deformed when no item is inserted between them. The method of the invention consists in directing a laser ray from a laser cell represented by the unit 5 onto the reflective annular strip 4b that is situated on the inside periphery of the wheel rim on the side opposite from the tread strip 4a. The reflective annular strip is calibrated to be concentric with (parallel to) the tread strip 4a so that it is subjected to radial deformation identical to the radial deformation of the tread strip when a flat item engages between the reference plate and the elastically deformable wheel. The laser ray LZ reflected by the reflective annular strip 4b to the cell 5 makes it possible to obtain an absolute measurement of the distance of said radial deformation, and thus of the real thickness of the flat item. The thickness e of the flat item 1 can be measured when said flat item is standing still or when it is in motion. In FIG. 1, the flat item 1 is moved in the direction D via a conveyor belt 6. In the arrangement shown in FIG. 1, the tread strip 4a of the wheel 3 is in contact with the belt 3 so as to nip the flat item 1 against the reference plane 2.

Naturally, it can be understood that the laser ray indicated by arrow LZ is directed radially onto the reflective strip 4b, i.e. perpendicularly to the direction D or indeed to the face of the flat item that is in contact with the wheel 3. In particular, the laser ray LZ is directed at the center of the deformed zone (rectilinear zone) of the tread strip or of the reflective strip.

FIG. 2 shows another implementation of the method of the invention with two elastically deformable wheels 3, 3' mounted to rotate about respective ones of two stationary axes 4, 4' while being disposed facing each other so as to nip the flat item 1 between them. In the absence of a flat item, the two wheels touch each other without any deformation of their rims. A laser cell 5, 5' is associated with each elastically deformable wheel and it sends a laser ray LZ, LZ' onto the reflective strip 4b, 4b' of the corresponding wheel in order to perform thickness measurement in differential manner.

In this implementation, the flat item 1 can still be in motion while its thickness is being measured. In particular, it can be moved between two conveyor belts represented by 6 and 6' which are themselves nipped between the two wheels 3 and 3'.

For each of the elastically deformable wheels, it is possible to use a "low-pressure" wheel of the type of the wheels described in French Patent No. 2 794 732, which wheels are bladed wheels that are made of elastically deformable elastomer.

The technique of measuring by laser ray reflection consists in sending a laser ray from a cell onto a reflective surface and in measuring the time taken by the laser ray to return to the laser cell after it has been reflected off said surface.

A laser cell for implementing the method of the invention can, for example, be obtained from Baumer insofar as such a laser cell makes it possible to measure the reflection time of a laser ray accurately, reliably, and with a short response time.

FIG. 3 is a diagrammatic section view showing the structure of two elastically deformable bladed wheels 3, 3' which are disposed facing each other for nipping the flat item 1. In this figure, two conveyor belts 6, 6' are shown between which the flat item is nipped. The two conveyor belts are nipped between the tread strips 4a, 4a' of the two wheels 3, 3' which can be motor-driven wheels. The axles of the two wheels are fixed to a deck 7 on either side of the conveyor path along which the flat item is conveyed. FIG. 3 shows the blades 4c, 4c' in each elastically deformable wheel. It also shows that the reflective annular strip 4b, 4b' extends from one face of a wheel over a portion of the width of the wheel that is blade-free.

It can also be seen in FIG. 3 that, in the internal space of a wheel defined by the reflective annular strip, a mirror 8, 8' angularly positioned at 45° is disposed to deflect the laser ray LZ, LZ' radially onto the reflective annular strip so that the laser cells 5, 5' can be disposed outside the elastically deformable wheels.

FIGS. 4 and 5 show, more precisely, apparatus for measuring, in real time, the thicknesses of flat mail items moved in series and on edge by a belt conveyor 6, 6' in a postal sorting installation. In this apparatus, two elastically deformable bladed wheels 3, 3' are used, as are two laser cells 5, 5' which are disposed outside the wheels 3, 3'. Each laser cell sends a laser ray which is guided in a tube 9, 9' provided with bends. Each tube has two right angles (more visible in FIG. 6) at which respective mirrors 8A, 8B are disposed that are angularly positioned at 45° in order to guide the laser ray from the cell to the reflective annular strip of a wheel and vice versa. The tube provided with bends and with the mirrors makes it possible to increase the path length of the laser ray so as to take account of the operating characteristics of the laser cell, so as to protect the laser cell from any dust flowing in the environment of the wheels, and so as to dispose the laser cell outside the wheels in order to facilitate maintenance operations.

From FIGS. 4 to 6, it can be understood that the path of a laser ray delivered by a laser cell is deflected through a right angle at a first mirror, and is then deflected through a right angle again at a second mirror before it is reflected off the reflective annular strip of a wheel, whereupon it follows the reverse path towards the cell in order to be retrieved and processed therein. The path is followed through a tube in the form of two L-shapes leading one into the other and occupying two mutually perpendicular planes. Such a tube can be obtained easily by molding a plastics material.

As indicated above, use is made of passage detectors, generally present along the path along which the mail items are conveyed through the sorting installation, in order to synchronize the thickness measurements taken on each mail item.

The elastically deformable wheels 3, 3' can be made of an elastomer material giving them good strength over time.

The reflective annular strip of each wheel is constituted by a surface made of elastomer whose pigmentation intrinsically presents reflection characteristics that are sufficient, but it is also possible to cover said elastomer surface with a paint having a higher reflective capacity.

FIG. 7 shows another implementation of a method of the invention, in which implementation the measurement by reflection of a laser ray is achieved by sending a laser ray LZ" by means of a laser cell 5" (LZ" and 5" having characteristics similar respectively to those of LZ, LZ' and to those of 5, 5') onto a conveyor belt 10. The mail item 1 is moved in the direction D between two conveyor belts 10, 11 past two elastically deformable wheels 12 that have characteristics presented in French Patent No. 2 794 732 and being disposed on the same side of the conveyor path, in contact with the conveyor belt 10, and spaced apart by a distance substantially identical to the maximum length of a mail item in the direction D. The tread strips of the wheels 12 are not deformed when no mail item goes past them. Between the two wheels 12, on the other side of the conveyor belts 10, 11 from the wheels, a reference pulley 13 is arranged which is exactly circular, which turns about its stationary center and against which the conveyor belt 11 bears, as does the conveyor belt 10 when no mail item 1 is passing between the two wheels 12. When a mail item 1 is situated between the two wheels 12, it is nipped by the two conveyor belts 10, 11 because of the pressure exerted by the wheels 12 on the conveyor belts 10, 11, because of the presence of the reference pulley 13 which serves as a bearing point, and because of the elastic deformation of the conveyor belt 10 further from the reference pulley 13. When the mail item 1 is compressed between the two conveyor belts 10, 11, the distance between the two belts is equal to the thickness $e$ of the mail item 1, which thickness also corresponds to the displacement of the conveyor belt 10 perpendicularly to the direction D facing the reference pulley 13. The displacement of the conveyor belt 10 is measured by sending a laser ray LZ" perpendicularly to the displacement by means of a laser cell 5" onto that face 14 of the conveyor belt 10 which is not in contact with the mail item 1. The face onto which the laser ray LZ" is sent is made of a reflective material or is covered entirely or in part (e.g. over a strip) with a reflective material.

The conveyor belt 11 can be pressed against a reference plate (not shown) or replaced with a reference plate on which the mail item slides.

The implementation shown in FIG. 7 is very easy and inexpensive to put in place in a postal sorting machine.

The invention claimed is:

1. A method of using reflection of a laser ray (LZ, LZ', LZ") for measuring the thickness (e) of a flat mail item (1) moving through a sorting machine, said method being characterized in that it comprises the following steps:
    nipping the mail item by means of an elastically deformable member (3; 3', 10) that is movably mounted and that moves with the movement of the mail item, said member having a first surface (4a, 4a') in contact with one face of said mail item, and a reflective second surface (4b; 4b'; 14) substantially parallel to said first surface; and
    directing the laser ray onto said reflective second surface (4b, 4b', 14) for the purpose of measuring the thickness of the mail item.

2. The method of claim 1, in which the mail item (1) extends in a certain longitudinal direction (D) and in which the laser ray is directed onto said reflective second surface in a direction that is substantially perpendicular to said longitudinal direction (D).

3. Apparatus for using reflection of a laser ray for measuring the thickness (e) of a flat mail item (1) moving through a sorting machine, said apparatus being characterized in that it comprises an elastically deformable member (3; 3', 10) that is movably mounted and that moves with the movement of the mail item (1), said member having a first surface (4a, 4a') in contact with one face of said mail item, and a reflective second surface (4b; 4b'; 14) substantially parallel to said first surface; and in that it further comprises means for directing the laser ray onto said reflective second surface (4b, 4b', 14) for the purpose of measuring the thickness of the mail item.

4. The apparatus of claim 3, in which said member (3; 3') is an elastically deformable wheel that presents an annular tread strip (4a; 4a') in contact with one face of the mail item and, on the side opposite from the tread strip, a reflective annular strip (4b, 4b') which is concentric with the annular tread strip and against which the laser ray is directed.

5. The apparatus of claim 3, in which said member (3, 3') is formed by two elastically deformable wheels disposed on either side of the mail item, each elastically deformable wheel presenting an annular tread strip (4a, 4a') and, on the side opposite from the tread strip, a reflective annular strip (4b, 4b') which is concentric with the annular tread strip, the annular tread strips (4a; 4a') of the two wheels being in contact with respective ones of the two opposite faces of the mail item, and in which two laser rays are directed onto respective ones of the reflective annular strips of the two elastically deformable wheels.

6. Apparatus according to claim 4, in which each laser ray is guided in a tube (9, 9') provided with bends and provided with mirrors (8A; 8B) inside it.

7. Apparatus according to claim 4, in which each elastically deformable wheel (3, 3') is a bladed wheel made of an elastomer material and in which the reflective annular strip of the wheel extends from one face of the wheel over a portion of the width of the wheel that is blade-free.

8. The apparatus of claim 3, in which said member is formed by a conveyor belt (10), said conveyor belt (10) having one face in contact with the mail item (1), and, on the side opposite from the face in contact with the mail item, a face (14) with a reflective surface onto which the laser ray (LZ") is directed.

9. A postal sorting machine comprising a belt conveyor (6,6') suitable for moving flat mail items (1) on edge, and apparatus according to claim 4, disposed such that the tread strip of each elastically deformable wheel (3; 3') is in contact with a conveyor belt.

* * * * *